UNITED STATES PATENT OFFICE.

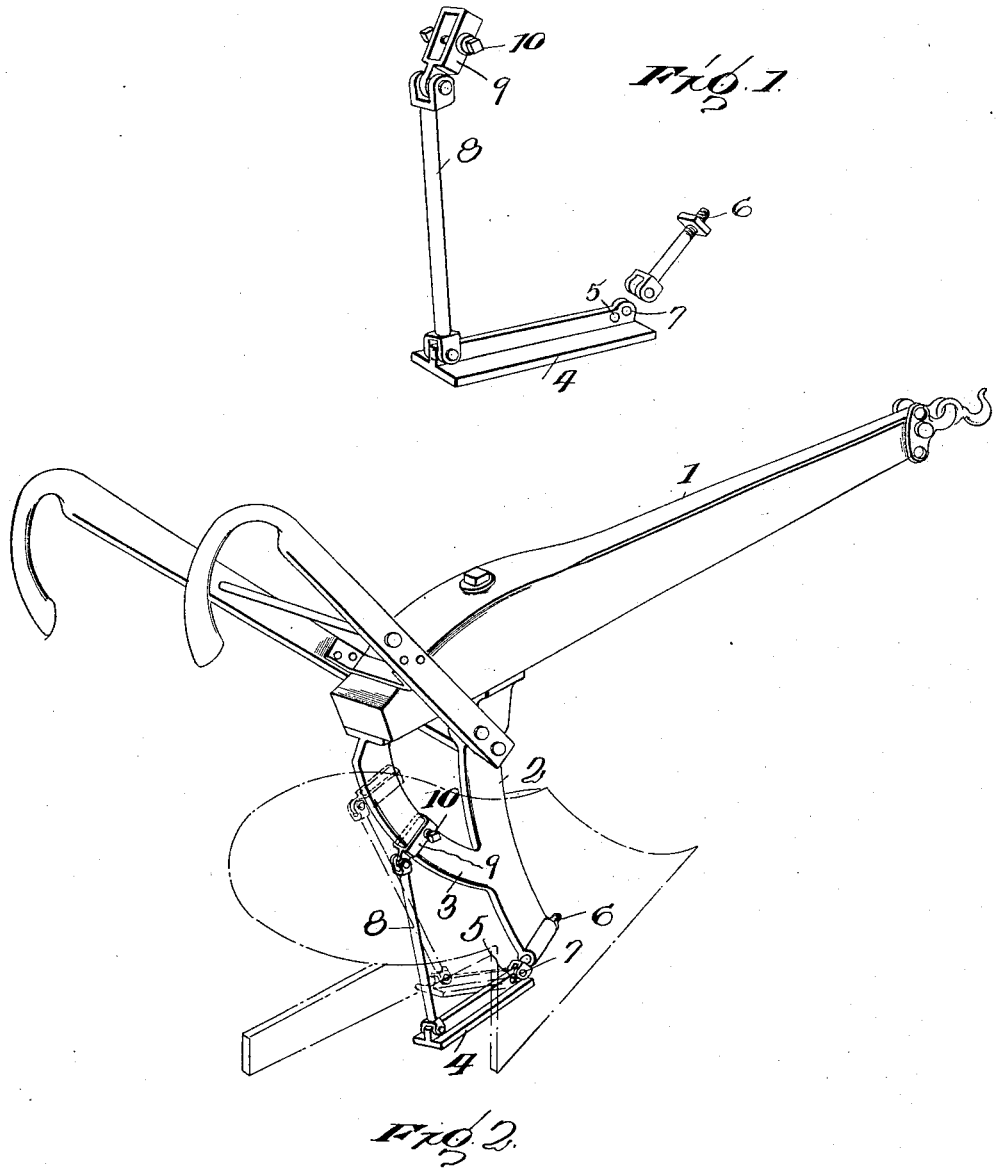

WILLIAM D. FELKEL, OF ELLOREE, SOUTH CAROLINA.

PLOW ATTACHMENT.

1,219,278.  Specification of Letters Patent.  Patented Mar. 13, 1917.

Application filed January 13, 1916. Serial No. 71,932.

*To all whom it may concern:*

Be it known that I, WILLIAM D. FELKEL, of Elloree, in the county of Orangeburg and State of South Carolina, have invented certain new and useful Improvements in Plow Attachments; and I do hereby declare the following to be a full, clear, and exact description of the invention, such as will enable others skilled in the art to which it appertains to make and use the same.

My invention contemplates an improved runner or landside for plows which in addition to properly supporting the plow so as to keep it in the correct position for making the furrow of the desired depth will also enable it to be maintained in the desired position and which will be capable of ready attachment by simple manipulation.

In the accompanying drawing I have shown in Figure 1 a perspective view of a plow runner embodying my invention, while Fig. 2 shows it applied to a plow.

As illustrated the plow is provided with the usual beam 1 and a stock 2, the latter being held in the desired fixed position by brace 3 extending from the stock to the rear of the beam.

4 designates the runner the object of which is well understood in the art. I have shown it longitudinally curved and of sufficient width at its base to slide over the ground without cutting. At its forward end the runner is shown formed with a plurality of apertures 5. Near its lower extremity the stock 2 has a bolt 6 passed through it and this bolt has a bifurcated extremity which receives the forward end of the runner, a bolt 7 passing through the lateral portions of the bolt 6 and the runner. The bolt 6 may be secured in any one of the apertures 5 of the runner to regulate the desired height of the latter at its forward end.

At its rear the runner is provided with a link 8 which is fulcrumed thereto. This link carries a sleeve 9 which is adapted to receive the brace 3. At opposite sides of the sleeve are binding bolts 10 by which the sleeve may be readily secured in the desired position on the brace. As the brace is curved rearward and upward it follows that the link may be adjusted at any desired height as shown in dotted lines and thus effect the proper disposition of the runner.

The device is easily operated and is inexpensive. Practice has demonstrated that a runner embodying my invention is both effective and durable. When it wears at its forward end it may be reversed, the portion previously secured to the bolt 6 being attached to the link 8 and vice versa.

I claim as my invention:

The combination with a plow stock having a brace and being formed with a slot at its lower end and a bolt having a bifurcated extremity extending through said slot, of a runner having a plurality of apertures and a bolt passed through one of said apertures and through the extremities of said former bolt, a link fulcrumed at the rear end of said runner and having a sleeve adapted to receive said brace and binding bolts carried by said sleeve.

In testimony whereof, I have signed this specification in the presence of two subscribing witnesses.

WILLIAM D. FELKEL.

Witnesses:
 EDGAR E. MOCK,
 W. A. IRICK.

Copies of this patent may be obtained for five cents each, by addressing the "Commissioner of Patents, Washington, D. C."